United States Patent
Guenzel

[11] 3,804,450
[45] Apr. 16, 1974

[54] MULTI-PURPOSE HAND TOOL

[76] Inventor: Henry O. Guenzel, 301 W. Sixth St., Rusk, Tex. 75782

[22] Filed: Aug. 18, 1972

[21] Appl. No.: 281,750

Related U.S. Application Data

[63] Continuation-in-part of Ser. No. 6,852, Jan. 29, 1970, abandoned.

[52] U.S. Cl. .................................. 294/51, 294/55
[51] Int. Cl. .............................................. A01b 1/20
[58] Field of Search .............. 294/2, 49, 51, 55, 57; 7/1 L, 14.55; 172/371, 375, 381

[56] References Cited
UNITED STATES PATENTS

| 1,728,858 | 9/1929 | Dreher | 294/55 |
| 2,618,501 | 11/1952 | Tallant | 294/55 |
| 104,140 | 6/1870 | Gregory | 294/55 |
| 171,252 | 12/1875 | Woodward | 294/51 |
| 88,138 | 3/1869 | Craine | 294/55 |
| 178,708 | 6/1876 | Bardell | 294/49 |
| 1,713,529 | 5/1929 | Grant | 294/51 |

Primary Examiner—Evon C. Blunk
Assistant Examiner—Johnny D. Cherry
Attorney, Agent, or Firm—E. Hastings Ackley

[57] ABSTRACT

A multipurpose yard and gardening hand tool having a flat bottomed spade or scoop member and an elongate multiple grip handle having a pointed end. The scoop member has a sharpened transverse linear open end edge and upright side walls terminating in an arcuate thickened substantially semi-circular gripping portion adjacent its juncture with the handle.

5 Claims, 5 Drawing Figures

PATENTED APR 16 1974　　　　　　　　3,804,450

3,804,450

MULTI-PURPOSE HAND TOOL

This application is a continuation-in-part of my copending application Serial No. 6852, filed January 29, 1970, now abandoned.

BACKGROUND AND OBJECTS OF THE INVENTION

This invention relates to hand tools generally, and more specifically to a new multi-purpose garden and yard hand tool.

In order to perform general gardening or yard work or chores, it is normally necessary to use several different types of tools, each of which is adapted to perform only a single function. The tool of this invention provides a single device which is capable of being effectively used in each of the following capacities: a hoe, a pick, a spade, a shovel, a clod breaker, a leveler, a stake driver, a furrow maker, a seed coverer, a soil firmer, a dibble, a plant divider, a sprout trimmer, a trowel, and a mixer, as well as for other purposes.

An important object of this invention is to provide a multi-purpose hand tool which is capable of performing various functions and yet is in the compact form of a single device which is relatively small, light weight and easy to carry.

Another object of the invention is to provide a multi-purpose hand tool which has a plurality of gripping surfaces by means of which the tool may be comfortably grasped and used in many different ways.

A further object of the invention is to provide a hand tool of the character described which may be economically fabricated in one piece of various metallic alloys, plastics, or other suitable material or combinations by die casting, stamping, molding, carving or the like.

Other objects and a fuller understanding of the invention may be had by referring to the following description of a device constructed in accordance with the invention and the appended claims, taken in conjunction with the accompanying drawings in which:

DESCRIPTION OF THE INVENTION

Figure 1:
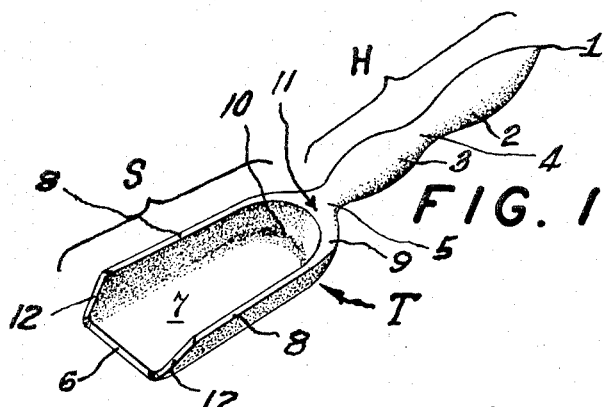
FIG. 1 is a perspective view of the hand tool of the invention.

In the drawings, a tool T constructed in accordance with the invention is shown, which comprises an elongate handle portion H and a scoop portion S. The elongate handle portion is formed with two gripping portions, a first or end grip means 2 and a second or mid grip means 3. Each of the grip means has a substantially ellipsoidal shape, and their adjacent ends merge at a point between the grip means in an intermediate section 4 of reduced diameter. The outer end of the end grip means tapers to substantially a sharp point 1, which may be slightly inclined at an angle to the longitudinal axis of the handle, as shown at 1a in FIG. 5, while the opposite inner or scoop end of the mid grip merges in a connector portion 5 of reduced cross section into the inner rear end of the scoop section S. The reduced portions 4 and 5 of the handle are substantially the same cross sectional size and shape.

Figure 5:
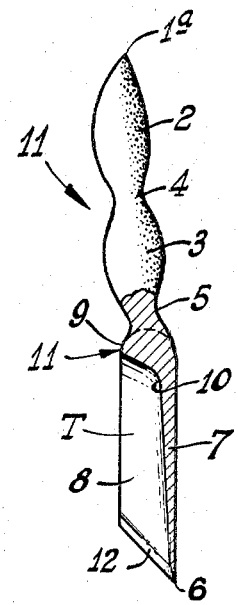
FIG. 5 is a longitudinal sectional view taken perpendicular to the bottom of the scoop along the longitudinal axis of a slightly modified form of the tool.
Figure 3:
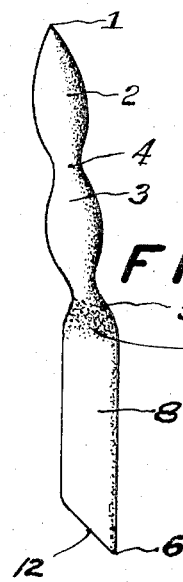
FIG. 3 is a side elevation of the tool of FIG. 1.
Figure 4:
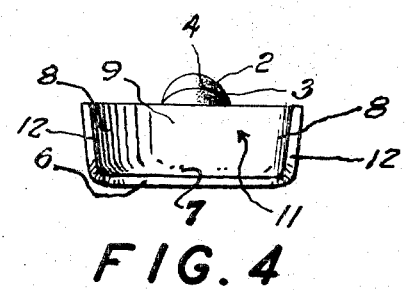
FIG. 4 is an end elevation of the scoop end of the tool of FIG. 1.

The scoop section S is formed with an elongate substantially planar bottom 7, which is rearwardly thickened as shown in FIG. 5, and has a pair of elongate upstanding longitudinal side walls 8 which project upwardly slightly divergently from each longitudinal side edge of the planar bottom, as shown in FIG. 4, and an inner end wall or heel 9 which joins the inner ends of the side walls and curves convergently arcuately inwardly in a substantially semi-circular configuration along and joined with the semi-circular inner end portion 10 of the planar bottom 7 of the scoop to merge with the reduced inner connector end portion 5 of the elongate handle section. The thickness of the end wall or heel 9 gradually increases from its juncture with the inner ends of the side walls along the inner end portion of the planar bottom 7 toward the center of the semi-circular inner end wall 9 of the scoop section at the thickest portion of said end wall and extends upwardly and outwardly therefrom at a slight angle with its longitudinal axis in substantial alignment with and intersecting a downwardly and outwardly beveled linear cutting edge 6 at the outer open end of the scoop section S, as clearly shown in FIG. 3.

Figure 2:
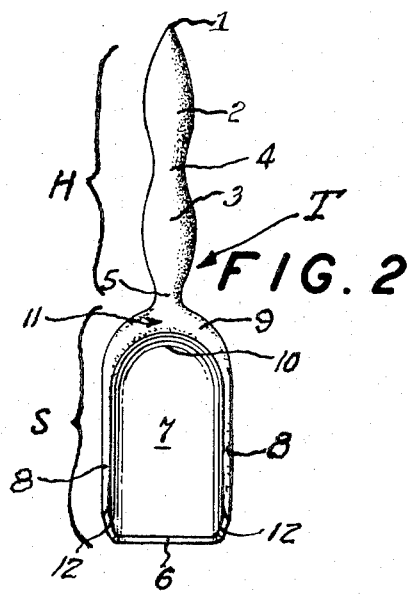
FIG. 2 is a plan view of the tool shown in FIG. 1.

The outer open end of the flat bottom 7 of the scoop section 5 is formed with a beveled linear cutting edge 6 which extends normal to the longitudinal axis of said scoop bottom, and the outer ends of the side walls 8 extend upwardly and rearwardly from the cutting edge 6 and are beveled outwardly from the inner to the outer surfaces thereof, as clearly shown in FIG. 1 and 2, to provide rearwardly inclined beveled cutting edges 12 at each outer ends of the side walls. The bevel in the cutting edge 6 is inclined downwardly and outwardly so that the cutting edge is at the underside of the bottom of the scoop and at the outer sides of the side walls. The inner wall surfaces of the side walls 8 and the circular inner end wall 9 merge in a concave arcuate or filleted shape with the bottom of the scoop.

Obviously, the simplicity of the shape of the tool permits its easy and inexpensive fabrication from any of several materials. While the device may be preferably cast or forged of aluminum, magnesium, steel, or other metal, or formed of a suitable synthetic plastic, it may also be made of wood, or of any suitable combination of such substances or materials.

Generally, for using the tool in spading, shoveling, clod-breaking, soil leveling, covering seeds, tamping and firming soil, driving stakes, making furrows, digging plants and weeds, measuring and mixing substances, trimming sprouts, as a mason's trowel as well as in various other ways, the hand end grip 2 is grasped manually whereby the increased leverage gained from holding the tool at such point aids in performing these tasks.

For using the tool as a pick, a hoe, or as a hand axe, the handle may be grasped manually at the mid grip 3, or by both the end grip 2 and the mid grip 3 for application of greater force to the cutting edge 6, and the longitudinal axial alignment of the handle H with the cutting edge 6 assures direct linear application of force from the handle to the cutting edge and reduces or eliminates lateral shock.

For using the tool as a dibble or as a furrow maker, the third grip 11 at the inner end of the scoop portion S of the tool may be grasped with both hands whereby the third grip 11 formed by the semi-circular inner end 10 of the planar bottom and the arcuate semi-circular inner end wall or heel 9 is utilized as gripping surfaces.

Specifically, the tool may be used as a hoe by grasping the mid grip 3 with one hand or by grasping the end grip 2 and the mid grip 3 simultaneously with both hands, and the arm or arms serve in lieu of the customary hoe handle, and again the force applied longitudinally of the handle is directed linearly to the cutting edge 6. Similarly, by reversing the tool and using the mid grip, the pointed end 1 of the handle H may be used as a pick.

By grasping the end grip 2 of the handle, the scoop portion S of the tool may be used as a spade, and when the point 1 of the handle is turned at an angle to the longitudinal axis of the handle as shown in FIG. 5, the point does not gouge or injure the hand of the user. It follows that by gripping the tool in this same manner, after spading, the tool may be used to shovel soil or other substance, the cutting edge 6 facilitating entry of soil or the like onto the planar bottom 7 between the side walls 8.

Clods of soil may be broken by grasping the end grip 2 of the handle and striking the clods with the flat bottom 7 of the scoop portion of the tool. By grasping the tool in the same manner and raking the straight side walls 8 of the tool across loosened soil, it may be leveled.

By grasping the end grip 2 and using the flat bottom 7 of the scoop portion as a striking surface, the tool may be used to drive stakes for plant support or for stringing cords to be used in laying out rows.

The tool may be used as a furrow maker when the bottom 7 of the scoop and the side walls 8 of the scoop are grasped in two hands and the pointed handle is utilized to penetrate and break the soil to a desired depth. Similarly, by reversing the tool and gripping it with one or both hands at the smoothly contoured configuration of the third grip 11 at the heel of the scoop portion of the tool, the pointed end 1 of the handle may then be used as a dibble for making holes in which to set out plants or bulbs.

In addition, the tool may be used as a small axe or sprout trimmer when the handle is grasped at the mid grip 3 with the cutting edge 6 parallel to the arm. If desired, of course, the end grip 2 may also be grasped with the other hand to increase the force applied to the cutting edge, the longitudinal axial alignment of the handle and the cutting edge providing for a sharp cutting blow without twisting, bending or breaking the tool, and without torque shock to the user. Also, by grasping the handle and sliding the bottom 7 of the scoop against the trunk of a tree, the cutting edge may be used to trim off small unwanted sprouts.

For small cement jobs, the tool may be used as a mason's trowel in handling, mixing, spreading and smoothing cement.

Obviously, the scoop portion S of the tool may also be used for rough measuring and mixing of fertilizers, sand, earth, humus, rock powder, etc.

It is apparent that the herein enumerated and described uses are not conclusive by any means, and other uses for this versatile tool can be found by the imaginative user.

The foregoing description of the invention is explanatory only and changes in the details of the construction illustrated and described may be made by those skilled in the art, within the scope of the appended claims, without departing from the spirit of the invention.

What is claimed and desired to be secured by Letters Patent is:

1. A multi-purpose hand tool comprising: a scoop section having a flat rearwardly thickened bottom with a planar underside, elongate longitudinally extending substantially upright slightly upwardly divergent sides, an arcuate semicircular end wall or heel merging arcuately with said bottom and said sides and gradually thickened rearwardly from said sides to its central thickest portion, and an open end opposite said heel; a downwardly and outwardly inclined cutting edge formed on said bottom at said open end perpendicular to said sides; rearwardly and upwardly inclined outwardly beveled cutting edges on each side at the ends thereof at the open end of the scoop section and merging smoothly with said cutting edge on said bottom; an elongate handle formed integrally at one end with the central thickened portion of said arcuate end wall of said scoop section opposite said open end, the other end of said handle being pointed, the longitudinal axis of said handle being inclined slightly upwardly from the thickest central portion of said heel at an angle to the planar underside of said bottom and in substantial longitudinal alignment with the downwardly and outwardly inclined cutting edge on the bottom at the open end of the scoop section to substantially intersect said cutting edge; said handle being formed with a plurality of longitudinally spaced ellipsoidal enlargements providing a plurality of longitudinally spaced grip means thereon intermediate its ends and having one grip means at the end opposite the scoop section and merging into said pointed end, and another of said plurality of grip means being formed medially between and spaced from said one grip means and said thickened central portion of said arcuate heel.

2. A hand garden implement as described in claim 1 wherein the thickened end wall or heel portion of said scoop section has rounded upper edges and is sufficiently thick to provide a third gripping means on said rear end of said scoop section for driving the pointed end of the handle as a pick or dibble, said medial grip means on said handle being spaced from said third grip means formed by said semicircular end wall or heel or said scoop section.

3. A hand tool of the character set forth in claim 1 wherein the pointed outer end of handle is disposed at a slight angle to the longitudinal axis of the handle in a direction toward the plane in which the flat bottom of the blade lies, whereby the point does not injure the hand of the user when the tool is used for chopping or digging.

4. A smoothly shaped one-piece hand tool comprising in combination: a flat bottomed blade or scoop having a straight front cutting edge and a rearwardly thickened bottom, with sides extending upwardly slightly divergently at an obtuse angle with respect to said flat bottom, said sides having sharp rearwardly inclined sloping front edges thereon and with the rear end portions of said sides curving and converging inwardly together with gradually increasing thickness to form on and with said blade or scoop a thick U-shaped smoothly formed heel thereon having rounded upper edges, the thickest mid-portion of said U-shaped heel having smoothly formed and joined therewith an elongate handle extending outwardly and upwardly at a slight angle to the flat bottom of said blade or scoop and with its longitudinal axis aligned to intersect the cutting edge at the front of the flat bottom of said blade or scoop, said handle having a plurality of longitudinally spaced smoothly shaped ellipsoidal gripping areas thereon, one near the outer end of said handle merging into a pointed end and another intermediate and spaced longitudinally medially of said handle from said one ellipsoidal gripping area and said U-shaped heel of said blade or scoop.

5. A hand tool of the character set forth in claim 3 wherein the pointed outer end of the handle is disposed at a slight angle to the longitudinal axis of the handle in a direction toward the plane in which the flat bottom of the blade lies, whereby the point does not injure the hand of the user when the tool is used for chopping or digging.

* * * * *